Jan. 19, 1932.  F. W. HOLDERLE ET AL  1,842,325
FOOD CABINET
Filed Jan. 17, 1930
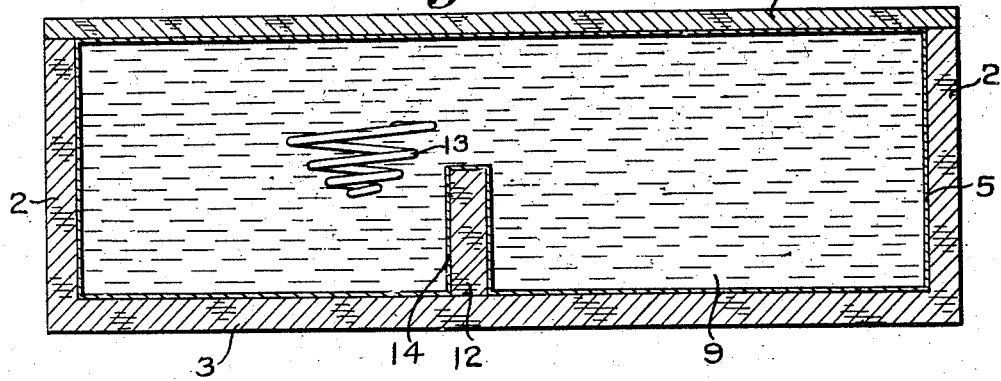
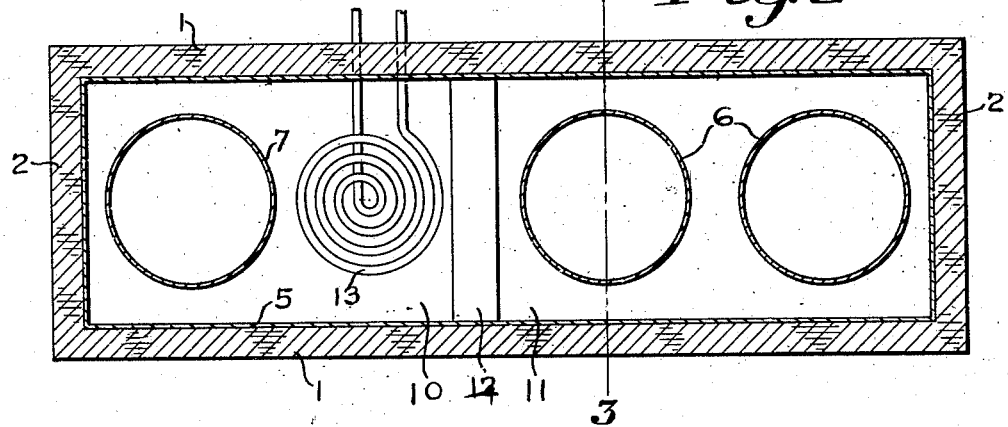
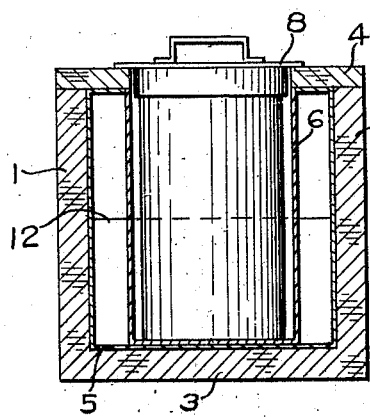
INVENTORS
Frederick W. Holderle and Carl L. Holderle
BY Harold E. Stonebraker
THEIR ATTORNEY Patented Jan. 19, 1932

1,842,325

UNITED STATES PATENT OFFICE

FREDERICK W. HOLDERLE AND CARL L. HOLDERLE, OF ROCHESTER, NEW YORK

FOOD CABINET

Application filed January 17, 1930. Serial No. 421,403.

This invention relates to a food cabinet, and has special reference to that type of construction used in ice cream dispensaries in which one part of a cabinet is kept at a somewhat lower temperature than another part in which a uniform temperature throughout is desirable, as where one part of the cabinet is employed for keeping ice cream in brick form, which it is desirable to keep at a freezing temperature, and in another compartment ice cream in bulk form is contained, which is best held at a relatively higher temperature that is substantially uniform throughout the compartment. In devices of the kind previously employed, difficulty has been experienced in keeping the bulk ice cream at a uniform temperature throughout its mass, with the result that ice cream in the bottom of the compartment, on account of the lower temperature therein, congeals to such an extent that it can be removed only with difficulty.

One object of the present invention is to afford a simple and practical construction whereby a practically uniform temperature is automatically maintained in one of two compartments of a container.

A further object of the invention is to so control the movement of a refrigerant liquid to and from a chamber that a substantially uniform temperature is maintained in the chamber.

Still another object of the invention is to provide an ice cream cabinet having two chambers filled with a liquid and separated by a baffle or partition, but communicating freely with each other at the top, one of which chambers has a cooling coil immersed in the liquid for cooling it, causing the liquid to circulate over the baffle to the other chamber so that the cooler liquid mingles with the warmer liquid to maintain a substantially uniform temperature.

To these and other ends, the invention consists in the construction and arrangement of parts that will appear from the following description when read in conjunction with the accompanying drawings, the novel features being pointed out in the claims following the specification.

In the drawings:

Figure 1 is a vertical longitudinal section of an ice cream cabinet illustrating one embodiment of the invention;

Figure 2 is a plan view of the same, and

Figure 3 is a section on line 3—3 of Figure 2.

Referring more particularly to the drawings, in which like reference numerals refer to corresponding parts in all the views, the embodiment illustrated comprises a cabinet having side walls 1, end walls 2, a bottom wall 3 and a top 4. The bottom, side and end walls are preferably lined with sheet material 5, and thermally insulated by means of cork or other suitable material.

Conveniently arranged within the cabinet and at one end thereof are a plurality of ice cream containers 6 of usual construction adapted to contain ice cream in bulk, and separated therefrom and adjacent the other end of the cabinet is a similar container 7 for ice cream in brick form. The containers 6 and 7 are preferably constructed of sheet material open at the top and provided with closures such as shown at 8. Filling the cabinet and surrounding the containers 6 and 7 is a suitable liquid refrigerant 9, such as a solution of alcohol.

It is desirable to keep the brick ice cream at a relatively low or freezing temperature while the bulk ice cream is kept at a temperature slightly above freezing and at a temperature which is maintained substantially uniform throughout the mass. The normal tendency of heat to rise tends to maintain a higher temperature at the top than at the bottom, with the result that the bulk ice cream is often too warm at the top of the container and too cold at the bottom, where it congeals to such an extent that it is difficult to remove the ice cream at the bottom of the container. With the end in view of maintaining the bulk ice cream at a uniform temperature throughout, the cabinet may be divided into two compartments or chambers 10 and 11 by means of a partition or baffle 12, in one of which, 10, may be arranged the container 7 for brick ice cream and the cooling coils 13 which may be of any suitable construction well known in the art. The other chamber 11 may be employed for keeping the bulk ice cream containers 6.

The partition or baffle 12 projects upwardly from the bottom of the cabinet to a point substantially midway between the top and bottom and extends entirely across the cabinet between the side walls 1. By this construction, a passageway for the circulation of the liquid between the chambers is provided at or adjacent the top thereof. The baffle is preferably constructed of heat insulating material such as cork, and protected from the refrigerant solution by a sheet metal facing 14.

In use, brick ice cream, which may be kept at a freezing temperature, is stored in the container 7, and bulk ice cream, which it is desirable to keep slightly above or at freezing temperature, is stored in the containers 6. The cooling coils are arranged in the chamber 10 with the container 7, and the refrigerant in said chamber is therefore in direct contact with the coils. The liquid in contact with the cold coils settles toward the bottom of the chamber, causing it to circulate and flow over the baffle into the chamber 11, while the warmer liquid returns to the top. By this arrangement, a constant substantially freezing temperature is maintained in the chamber 10, which may vary or rise from the bottom toward the top, while at the same time maintaining a slightly higher temperature in the chamber 11 which is practically constant and uniform throughout its depth.

It will thus be noted that a food cabinet is provided having two chambers, one a refrigerant chamber in which the cooling coils and a container for food desired to be kept at a freezing temperature are placed, the other chamber being a cooling chamber in which are containers for food which it is desired to keep at a uniform temperature throughout, slightly above the temperature of the refrigerant chamber.

Although the invention has been described with reference to a single embodiment, it will be understood that this application is intended to cover such changes or modifications as come within the spirit of the invention or scope of the following claims.

We claim:

1. In a food cabinet, the combination with a refrigerant chamber having a cooling coil therein, of a cooling chamber communicating therewith, a liquid refrigerant in said chambers, and heat insulated means for confining the circulation of said liquid refrigerant between said chambers to the upper portion thereof.

2. In a food cabinet, the combination with a refrigerant chamber having a cooling coil therein, of a cooling chamber communicating therewith, a liquid refrigerant in said chambers, and a heat insulated baffle projecting upwardly between said chambers for confining the circulation of said liquid refrigerant between said chambers to the upper portion thereof.

3. In a food cabinet, the combination with a refrigerant chamber having a cooling coil therein, of a cooling chamber communicating therewith, a liquid refrigerant in said chambers, and a heat insulated baffle projecting upwardly between said chambers to a point substantially midway between the top and bottom thereof for confining the circulation of said liquid refrigerant between said chambers above said baffle.

4. In a food cabinet, the combination with a refrigerant chamber having a cooling coil therein, of a cooling chamber communicating therewith, a liquid refrigerant in said chambers, a baffle arranged between said chambers for confining the circulation of said liquid refrigerant between them to the upper portion thereof, said baffle comprising a heat insulating partition, and a covering of sheet material for protecting it from the action of the liquid.

5. In a food cabinet, the combination with a refrigerant chamber having a cooling coil and a container for food therein, of a cooling chamber also having a food container therein, a liquid refrigerant surrounding said cooling coil and the food container, a heat insulated partition between said chambers, and a liquid passageway between said chambers at the top of said partition.

In witness whereof, we have hereunto signed our names.

FREDERICK W. HOLDERLE.
CARL L. HOLDERLE.